UNITED STATES PATENT OFFICE.

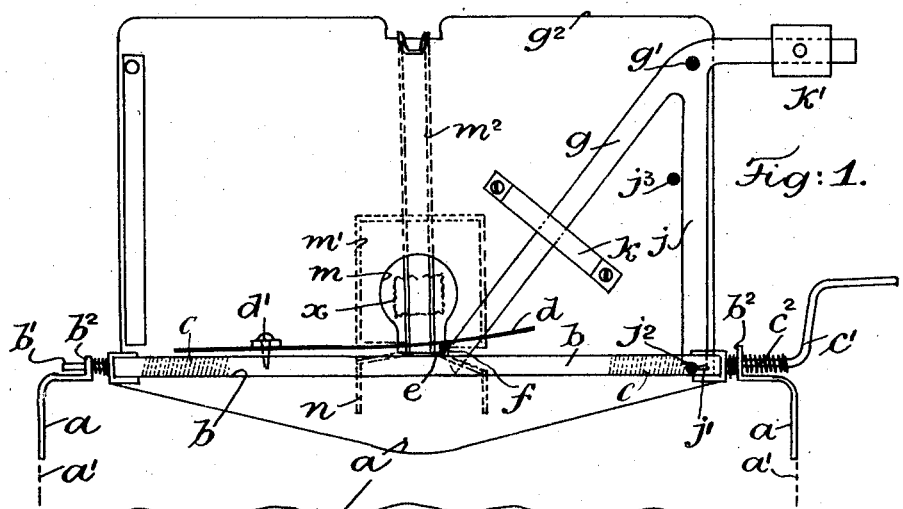
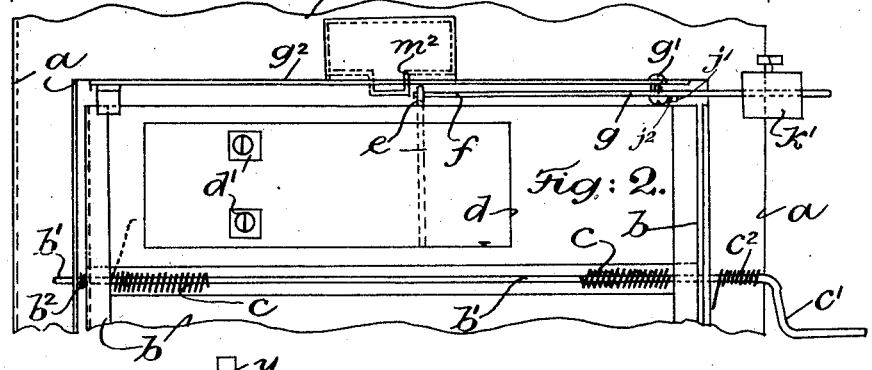
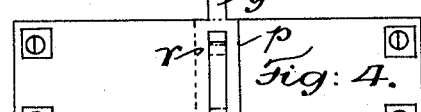
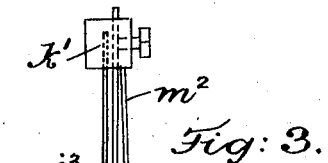
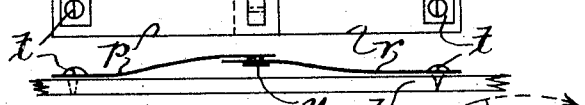
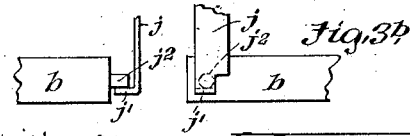

BENJAMIN PARKER AND WILLIAM FERRIOR WILLIAMS, OF WAROONA, WESTERN AUSTRALIA, AUSTRALIA.

RAT-TRAP.

1,345,227. Specification of Letters Patent. Patented June 29, 1920.

Application filed July 13, 1918. Serial No. 244,767.

*To all whom it may concern:*

Be it known that we, BENJAMIN PARKER and WILLIAM FERRIOR WILLIAMS, both subjects of His Majesty the King of Great Britain, residing at Waroona, Western Australia, Commonwealth of Australia, have invented certain new and useful Improvements in Rat-Traps, of which the following is a specification.

This invention as its title implies provides a device of an improved and novel character and construction principally for the trapping of rats, mice, rabbits, hares and other such like animals and the device is also applicable for the dipping and washing of sheep and such like purposes. By this invention we attain the following advantages: 1. The initial means for operating the trap are of a delicate and sensitive construction with the result that the action of trapping is silent and instantaneous and avoids suspicion and fear by the victims. 2. The bait while visible to the intended victim remains intact and free from interference or contact by said victims. 3. The victims are trapped alive and without mutilation which in the case of rabbits or hares is desirable for commercial reasons. 4. The trap by the one and same continuous movement and operation is "returned" to its normal or trapping position. These and other advantages will be apparent from the following explanation of the use and construction of the trap aided by the attached drawings wherein Figure —1— is a front elevation of the trap in position for use. Fig. —2— is a plan thereof with a portion of the revoluble door removed. Fig. —3— is an end view showing by directional arrows and broken lines the revoluble door in its open or trapping position. Figs. 3ª and 3ᵇ, respectively, represent a detail end elevation and a detail side elevation of parts of the improved trap. Figs. 4 and 5 are plan and side views of an alternative construction of the initial operative member showing same of a divided and flexible diaphragm construction. Referring to said drawings $a$ is the foundation frame of the trap whereby same is adapted to be placed over the mouth of the pit or prison $a'$ into which the victims are precipitated by the release and rotation of the door. This door $b$ is carried on the central hinge rod $b^1$ and mounted in bearings as $b^2$. On this hinged rod $b^1$ is coiled a tensional spring $c$ whose purpose is to energize the door $b$ and urge it to the revoluble position seen in Fig. —3— when released by the depressible detent $e$.

This tensional spring $c$ is wound up by the handle $c^1$ and the door is maintained in its energized condition by the retention spring $c^2$ which is coiled around the handle end and suitably anchored to the frame $a$. This spring $c^2$ prevents any back or return movement of the door $b$. On said door and at an approved position near to the bait $x$ the resilient depressible plate $d$ is flexibly and hingedly secured to the revoluble door by screws $d^1$. This plate acts as the agent for the initial release of the door and operation of the trap—said plate being depressible by the pressure thereon or contact therewith of the victim. This plate $d$ carries a projectional pin or detent $e$ which makes and holds contact against the nose $f$ of the swinging lever $g$ pivoted at $g^1$ to the rear wall $g^2$ of the frame $a$.

This lever $g$ is guided in its movement by the diagonal stay $k$ and having the counter balance weight $k^1$ whereby said lever is returned to the normal or home position and in operative contact with the detent pin $e$. This lever carries a down arm $j$ formed with a rectangular terminal lug $j^1$ on which the door is retained in its horizontal or normal position by means of a pin $j^2$ suitably projecting from the inner edge of the door. As soon as the lever is returned by the weight $k^1$ to the home position seen in Fig. —1— and in full lines as in Fig. —3— it rests thereat and against the stop pin $j^3$.

At the rear of the wall $g^2$ and immediately behind the therein opening $m$ is removably suspended the bait box $m^1$ by the wire cradle frame $m^2$ said frame having the legs $n$ whereby said box is firmly held in proper position. The bait as $x$ is exposed and held between the wires $m^2$ and behind the opening $m$ in order to be visible for the decoy of the victims.

Referring to Figs. 4 and 5 in which the initially operative and depressible agent is of an alternative construction being made in two halves of a diaphragm form as $p$ and $r$ and secured in a flexibly hinged manner to the door $b$ by screws as $t$. One of these portions as $r$ is made with the contact maker or tongue $y$ for causing the outward release and movement of the lever $g$ aforesaid. The operation of the trap is as follows—:—Bait as $x$ of an approved nature is placed between the wires $m^2$ and the trap set ready for action as seen in Fig. —1— and in full lines in Fig. —3— and upon the rat or other victim making contact with or pressure upon the depressible plate as $d$ or $p$—$r$ the contact pin $e$ or $y$ thereupon releases the lever $g$ and allows it to swing outwardly and thereby release the revoluble door $b$ by the withdrawal of the lug $j^1$ of the arm $j$ and by reason of the tensional and energizing spring $c$ of the door $b$ is instantaneously revolved as seen in broken lines in Fig. —3— thus precipitating the victim down into the prison $a^1$. The lever $g$ by its weight $k^1$ is returned to its home position and the retention lug $j^1$ ready to engage with the pin $j^2$ for the retention of the door $b$ in its normal position as seen in Figs. 1 and 3 for the trapping of the next victim.

The spring $c^2$ acts simply as an auxiliary movement counteracting means relatively to the door $b$ when the latter is released and springs open to prevent any swinging movement of the said door, and particularly obstructing continuous rotating spring relaxing movement of said door when opened to such an extent as to cause the trapped animal to fall therefrom, and thereby avoid unwinding of the springs $c$ to such degree as to necessitate rewinding of said springs every time the trap is reset. The contact pin $e$ simply bears on the free end of the lever $g$ as shown by Fig. 1, and holds the lug $j^1$ under the pin $j^2$ projecting from one side of the door $b$, the release of the lever $g$ effecting a clearance of the said lug from under the pin by the action of the weight $k^1$. The lug $j^1$ holds the door closed against the tendency of the springs $c$ to open the door.

What we claim as our invention and desire to secure by Letters Patent is:

In a trap of the class specified, the combination of a foundation frame having an opening therein, a door mounted in the said opening to normally close the latter and having springs co-acting therewith to set up an automatic opening operation of the door when the latter is released, the door having projecting means at one side, a weighted lever mounted to swing relatively to the door and frame and provided with arms, one of which has a lug to engage under the projection of the door and hold the latter closed against the tendency of the opening movement of the springs thereof, a counter-acting spring to retard rotation of the door when the latter is released, a yielding pressure plate mounted on the door and operative by the weight of the animal thereon, said pressure plate having a projection to bear upon the free end of the remaining arm of the lever, and a bait holding means disposed adjacent to the said pressure plate.

In testimony whereof we have hereunto set our hands in presence of two subscribing witnesses.

BENJAMIN PARKER.
WILLIAM FERRIOR WILLIAMS.

Witnesses:
RICHARD SPARROW,
U. W. BURKE.